US007998270B2

(12) United States Patent
Asakura et al.

(10) Patent No.: US 7,998,270 B2
(45) Date of Patent: Aug. 16, 2011

(54) CEMENT CLINKER AND PROCESS FOR PRODUCING THE SAME

(75) Inventors: Etsuro Asakura, Chichibu-gun (JP); Kenichi Shimosaka, Chichibu-gun (JP); Makio Yamashita, Chichibu-gun (JP); Ryuichi Komatsu, Ube (JP)

(73) Assignee: Mitsubishi Materials Corporation, Tokyo (JP)

( * ) Notice: Subject to any disclaimer, the term of this patent is extended or adjusted under 35 U.S.C. 154(b) by 798 days.

(21) Appl. No.: 11/720,519

(22) PCT Filed: Dec. 2, 2005

(86) PCT No.: PCT/JP2005/022191

§ 371 (c)(1), (2), (4) Date: Mar. 4, 2008

(87) PCT Pub. No.: WO2006/059718

PCT Pub. Date: Jun. 8, 2006

(65) Prior Publication Data

US 2008/0190328 A1 Aug. 14, 2008

(30) Foreign Application Priority Data

Dec. 3, 2004 (JP) ................................ 2004-352076

(51) Int. Cl.
*C04B 7/36* (2006.01)
*C04B 7/42* (2006.01)

(52) U.S. Cl. ...................................................... 106/739

(58) Field of Classification Search .................. 106/739
See application file for complete search history.

(56) References Cited

U.S. PATENT DOCUMENTS 3,785,844 A * 1/1974 Kawano ........................ 106/757
3,947,288 A * 3/1976 Kawano et al. ............... 106/735
7,001,454 B2 * 2/2006 Lopez-Gonzales et al. .. 106/739

FOREIGN PATENT DOCUMENTS

| | | |
|---|---|---|
| JP | 60-176955 | 9/1985 |
| JP | 61-136946 | 6/1986 |
| JP | 62-241546 | 10/1987 |
| JP | 8 12404 | 1/1996 |
| JP | 2002 233732 | 8/2002 |
| JP | 2003 313056 | 11/2003 |
| JP | 2004 75487 | 3/2004 |
| JP | 2006-182638 | 7/2006 |

OTHER PUBLICATIONS

Montvila et al., "Physicomechanical properties of high elite clinkers" TSEMENT (1980), (5), p. 15-16. abstract only.*

Wei Shen, et al., "Cement Technology", Wuhan University of Technology Press, Mar. 1998, pp. 16 and 24 (with English Translation of pp. 16 and 24).

Taylor, "Cement Chemistry", U.K., Academic Press Limited, pp. 80-93, 1990.

Apr. 20, 2011 Office Action issued in CN200580041229.9 (English translation included).

Wang et al.—Adapting Crystal Nucleus Material Blending, Optimizing Process Parameters, and High Strength Cement Prototype (English translation included).

* cited by examiner

*Primary Examiner* — Paul Marcantoni

(74) *Attorney, Agent, or Firm* — Oblon, Spivak, McClelland, Maier & Neustadt, L.L.P.

(57) ABSTRACT

A cement clinker which necessitates no considerable change in the main chemical components and mineral components of cement, is free from preheater coating problems and adverse influences on cement properties, and is effective in reducing the heat quantity required for burning; and a process for producing the cement clinker. In the process for cement clinker production a substance having a melting point higher than the temperature of a liquid phase of the cement clinker and serving as crystal nuclei for $C_3S$ is incorporated include a fine powder of refractory brick, particles of an ordinary Portland cement clinker, a fine powder of a high-early-strength Portland cement clinker, a high-early-strength Portland cement, and a fine powder of quicklime. Due to this, alite generation is accelerated even at a low temperature. As a result, high-quality clinker can be produced through burning using a small unit heat quantity and no decrease in cement quality results. The process contributes to a reduction in preheater coating amount and prolongation of the life of the refractory bricks.

12 Claims, No Drawings

CEMENT CLINKER AND PROCESS FOR PRODUCING THE SAME

CROSS-REFERENCE TO RELATED APPLICATIONS

This application is a 371 of PCT/JP05/22191 filed Dec. 2, 2005 and claims the benefit of JP 2004-352076 filed Dec. 3, 2004.

TECHNICAL FIELD

The present invention relates to a cement clinker and a process for producing the same, and more particularly, to cement clinker and a process for producing the same which can reduce the heat quantity in a burning step.

Priority is claimed on Japanese Patent Application No. 2004-352076, filed Dec. 3, 2004, the content of which is incorporated herein by reference.

BACKGROUND ART

In recent years, one of the remarkable developments in cement production technology is the technical development of reducing the heat quantity required for burning a cement clinker (referred to as "clinker", hereinafter). That is, there has been a change in burning technology, i.e. it has switched from a wet-burning method, which includes adding water to a mixed raw material to be uniformed, and thereafter burning the resultant mixture, thereby necessitating a large heat quantity required for burning, to a dry-burning method, which includes drying cement raw material by blowing hot air, and then crushing the raw material, and thereafter burning the raw material, so as to reduce the heat quantity required for burning, and further it has reached the development of a new-suspension type burning method, which includes calcining a mixed raw material by a preheater in advance, and placing the resultant calcined raw material into a rotary kiln (referred to as "kiln", hereinafter) so as to further reduce the heat quantity required for burning.

Thereafter, as a technology for further reducing heat quantity required for burning, (1) a method of (non-patent document 1) changing the main chemical composition of a mixed raw material, and (2) a method of using a flux (non-patent document 1) have been developed.

The method (1) includes changing the contents of alumina, iron, sulfur, etc., to increase the quantity of a liquid phase at the time of burning, so as to ease to generate clinker even at a relatively low temperature.

The method (2) includes adding a flux such as fluorites (calcium fluoride), which promotes the burning reaction to cement raw materials.

[Non-patent document 1] H. F. W. Taylor, Cement Chemistry, U.K., ACADEMIC PRESS LIMITED, 1990, (1) method of changing the main chemical composition of compounding raw materials, page 80, (2) a method using a flux, p 93.

DISCLOSURE OF THE INVENTION

However, method (1) of changing the main chemical composition of mixed raw material, and method (2) of using a flux have the following problems.

That is, in the method (1) of changing the main chemical composition of mixed raw material, clinker has a mineral composition different from that of a generic Portland cement. Thus, when the resultant cement is used to prepare concrete or mortar, these products will exhibit unique flowability and strength. And as a result, the use of cement is limited, and hence it was not possible to use the cement practically and widely.

In the method (2) of using a flux, the component elements (such as fluorine) may be volatilized in a kiln, and may be adhered to an inner wall of the kiln or a preheater) thereby causing coating trouble, or producing cement having singular physical properties due to the influence of the flux component. These phenomena became significant, as the added amount of flux increased.

Thus, the inventors of the present invention have thoroughly researched, and as a result, they paid attention to alite, which is one of the main constitutional minerals of clinker. That is, they have found that the heat quantity required for burning can be further reduced by using the growing mechanism of alite, which grows through heterogeneous nuclei generation, and accelerating the generation of alite from a temperature which is lower than conventional temperature, and as a result, they have completed the present invention.

It is an object of the present invention to provide a cement clinker, and a process for producing the cement, which is capable of reducing the heat quantity required for burning and the coating amount of a preheater and prolonging the life of a fire refractory brick, without greatly changing the main chemical composition and mineral composition of cement or deteriorating the quality thereof.

A first aspect of the present invention is a cement clinker including alite, produced by burning a mixed raw material which consists of plural cement raw materials which are mixed at a raw material step at a burning step, in which a substance serving as a nucleus for generation of alite or a nucleus-containing substance containing a substance serving as a nucleus for generation of alite having a melting point higher than the temperature of a liquid phase of said cement clinker is incorporated into at least one of the cement raw material and the mixed raw material before the burning step, ad thereafter the resultant mixed raw material into which the substance is incorporated is burned to produce a cement clinker. The mixed raw material includes a cement clinker in a burning step and a precursor thereof.

In accordance with the first aspect of the present invention, it is difficult for alite as a main constitutional mineral of a cement clinker to generate spontaneously a nucleus of alite under an ordinal generation conditions of a cement clinker and hence, alite has a character to start the generation of crystals using another material as a nucleus (a heterogeneous nucleus). Thus, the substance is added from outside the growing environmental phase, thereby allowing it coexist in a cement clinker of a liquid phase. By doing so, the generation of alite is accelerated from at a lower temperature than before using the substance added as a nucleus. By this, the time to complete the generation of alite is shortened, and the maximum heating temperature will decrease. As a result, the heat quantity for burning can be reduced without changing the main mineral composition of cement or using cement or a flux. Crystalline growth consists of two basic steps of a nucleus growth in which a crystal bud generates from an environmental phase having nothing and a steady crystal growth after the generation of a nucleus. In addition, the generation of a nucleus is classified into two of a natural nucleus generation in which a substance which grows per se becomes a nucleus, and a heterogeneous nucleus growth in which a different substance becomes a nucleus. In the case of the present invention, even if it is the same crystal as the crystal which grows, in the case in which a substance is added from outside an environmental phase which grows, and crystal grows allowing it as a nucleus, it will be included into a category of a heterogeneous nucleus generation.

A raw material step is an initial step of a cement production process, and cement raw materials such as limestone, clay, silica rock, iron raw material, etc. are charged into a raw material mill, and these raw materials are crushed into a predetermined particle size, while mixing. In addition, clays before being crushed are dried by a dryer if necessary. In a burning step, mixed raw materials are charged into a kiln which is the main type of machinery in clinker burning equipment, and thereafter the mixed raw materials are heated in a burning zone up to approximately 1450° C., while slowly moving the kiln downwardly. Meanwhile, the mixed raw materials are subjected to steps such as drying, dehydration, decomposition, such that each of lime (calcium oxide), silica, alumina, etc. contained in the mixed raw materials are recombined with each other around the burning zone to generate a clinker composition compound.

A liquid phase is generated in the step. The generation temperature of a liquid phase (referred to as "liquid phase temperature", hereinafter) ranges approximately from 1200 to 1300° C.

The main constitutional mineral of a cement clinker consists of alite, belite and a gap phase which fills intermediate spaces therebetween. Alite is a mineral which occupies approximately half of a clinker composition, having an average particle size of approximately 20 μm. Alite is a substance which generates a heterogeneous nucleus.

A substance which serves as a nucleus of alite (referred to as "substance serving as a nucleus of generation" hereinafter) must be one which will be neither decomposed nor fused even if it comes into contact with a liquid phase. For that purpose, the substance must have a melting point which is higher than the liquid phase generation temperature (approximately 1200 to 1300° C.) of a cement clinker.

For example, as a substance serving as a nucleus of generation, a firebrick, magnesium oxide, platinum, rhodium quicklime, alite to be added newly, belite, etc are exemplary. However, in the cement clinker which is burned out from a rotary kiln, substances which are stable as a solid phase are preferable. For example, a cement clinker which is easily available in a cement factory, cement produced therefrom, etc. are exemplary. It should be noted that if fine limestone powder is charged into a rotary kiln which is running at a high temperature from a kiln-head, then the fine limestone powder causes decarboxylation at a high temperature to be converted into quicklime, before coming into contact with the mixed raw materials or a cement clinker. As a result, almost the same effect as those derived from charging quicklime fine powders is obtained. In this way, if a substance having a melting point of higher than 1300° C. is added as a nucleus from the outside, then the generation of alite is accelerated, thereby reducing the heat quantity for burning. The particle size of a substance serving as a nucleus is preferably small. For example, the particle size of a substance serving as a nucleus of generation is not larger than 5 μm.

Charging of a substance serving as a nucleus of generation or a nucleus-containing substance which contains the substance serving as a nucleus of generation is performed before a burning step. Specifically, the charging may be performed in either the burning step or the raw material step. Or, the charging of a substance serving as a nucleus of generation or a nucleus-containing substance which contains the substance serving as a nucleus of generation may be performed in both of the burning step and the raw material step. The most desirable place in the rotary kiln where the substance charged lands is an area between the place where a liquid phase of a cement clinker in a burning step begins to generate and the place where alite begins to generate. It is necessary to plan the place and the method for charging a substance serving as a nucleus of generation or a nucleus-containing substance which contains the substance serving as a nucleus of generation, while evaluating the operating conditions of the rotary kiln and the quality of a cement clinker for fear that substance serving as a nucleus of generation or a nucleus-containing substance which contains the substance serving as a nucleus of generation will be changed into a different compound before the substance serving as a nucleus of generation or the nucleus-containing substance will reach the possible alite-generation area in the rotary kiln so as to achieve a melting point lower than the liquid phase temperature, thereby not accelerating the generation of alite.

The substance serving as a nucleus of generation or the nucleus-containing substance may be incorporated into at least one of cement raw material and the mixed raw materials previously at a raw material step. Specifically, this substance may be charged into a raw material mill together with cement raw material, or a clay dryer. In addition, a substance serving as a nucleus of generation or a nucleus-containing substance may be charged into a predetermined point (one point or plural points) of a cement clinker burning equipment at a burning step. Specifically, a preheater, a burning furnace, ad a rotary kiln are exemplary. The point where a substance is charged into a rotary kiln is preferably present in a liquid-phase-generating area of a rotary kiln in burning or a lower temperature side therefrom. Specifically, the charging inlet may be a kiln-tail or a kiln-head. The incorporating amount of a substance serving as a nucleus of generation is not limited. For example, the amount is not more than 5 parts by weight to 100 parts by weight of the mixed raw materials. In addition, the incorporating amount of a nucleus-containing substance is not limited. For example, the amount is not more than 5 parts by weight to 100 parts by weight of the mixed raw materials, expressed in terms of conversion by a substance serving as a nucleus. As a nucleus-containing substance, for example, a cement clinker, a cement, quicklime, fine powder of a firebrick, etc. are exemplary. In such a case, in a nucleus-containing substance, the component ratio of the substance serving as a nucleus generation of alite is not limited.

A second aspect of the present invention is the cement clinker as set forth in the first aspect of the present invention, in which the substance is a substance which is contained in a cement clinker, and is incorporated in an amount of not more than 5 parts by weight to 100 parts by weight of the mixed raw material into at least one of the cement raw material and the mixed raw material in the raw material step.

The substance which is contained in a cement clinker is preferably a substance which exists stably in a cement clinker, having a melting point of not lower than 1500° C. For example, a cement clinker per se may be used, and alite or belite may be used. Or, a firebrick (having a melting point of approximately 1,800° C.) may be used.

The incorporating amount of a substance serving as a nucleus of generation is not more than 5 parts by weight to 100 parts by weight of the mixed raw material. If the amount is more than 5 parts by weight, then the quality of cement clinker may deteriorate, depending on the kind of the substance. The incorporating amount of substance serving as a nucleus of generation preferably ranges from 0.05 to 10 parts by weight. Within this range, a more favorable effect, such as improvement of quality derived from the further reduction of heat quantity for burning of cement clinker and the reduction of free lime, is obtainable.

A third aspect of the present invention is the cement clinker as set forth in the first aspect or the second aspect of the present invention, in which the substance is a cement clinker or a cement.

The substance serving as a nucleus of generation may be either a cement clinker, or a cement. In addition, a mixture of both of a cement clinker and a cement may be used. In such a case, the mixing rate ranges, for example, from 5:95 to 5050. The kind of cement is not limited. For example, various Portland cements such as an ordinary Portland cement, an high-early-strength Portland cement, a moderate heat Portland cement, etc are exemplary. As a cement clinker, a cement clinker which serves as a raw material of these cements (various Portland cements) can be adopted. In particular, a cement clinker for high-early-strength Portland cement having a larger amount of alite or a cement clinker therefor is preferable.

A fourth aspect of the present invention is the cement clinker as set forth in any one of the first aspect to the third aspect of the present invention, in which the substance has a particle size of not more than 5 mm.

If the particle size of a substance serving as a nucleus of generation is larger than 5 mm, depending on the kind of substance, the quality of a cement clinker may deteriorate. The particle size of a substance is preferably not larger than 0.01 mm. Within this range, more favorable effect, such as improvement of quality and the further reduction of heat quantity for burning of a cement clinker, is obtainable.

A fifth aspect of the present invention is a process for producing a cement clinker which contains alite including burring a mixed raw material which is mixed at a raw material step, at a burning step, in which a substance serving as a nucleus of generation of alite having a melting point higher than the temperature of a liquid phase of the cement clinker is incorporated into at least one of the cement raw material and the mixed raw material before the burning step.

A sixth aspect of the present invention is the process for producing a cement clinker as set forth in the fifth aspect of the present invention, in which the substance is a substance which is contained in a cement clinker, and is incorporated in an amount of not more than 5 parts by weight to 100 parts by weight of the mixed raw material into at least one of the cement raw material and the mixed raw material, in the raw material step.

A seventh aspect of the present invention is the process for producing a cement clinker as set forth in the fifth aspect or the sixth aspect of the present invention, in which the substance is a cement clinker or a cement.

An eighth aspect of the present invention is the process for producing a cement clinker as set form in any one of the fifth aspect to the seventh aspect of the present invention, in which the substance has a particle size of not more than 5 mm.

A ninth aspect of the present invention is the process for producing a cement clinker as set forth in any one of the fifth aspect to the eighth aspect of the present invention, in which the burning is performed by clinker burning equipment having a preheater, a burning furnace and a rotary kiln, and the substance is charged into at least one of the preheater, the burning furnace, kiln-head or kiln-tail of the rotary kiln in the clinker burning equipment.

For charging a substance serving as a nucleus of generation of alite into clinker burning equipment, an existing apparatus may be utilized in the clinker burning equipment, or an exclusive apparatus may be utilized. For example, using an existing burner for fuel, the substance may be incorporated into fuel such as dust coal, so as to be charged into a rotary kiln. Or, the substance may be charged into a preheater or a rotary kiln using a dedicated blowing pipe or chute. In the case of charging the substance serving as a nucleus of generation of alite from a kiln-tail, it is preferable to incorporate the substance serving as a nucleus into one of a flammable material and cement raw material and shape the resultant mixture into a sphere, a cylinder, a doughnut, thereby accelerating the moving speed of the substance in a rotary kiln toward a kiln-head. Thereby the substance serving as a nucleus hardly reacts with the mixed raw materials into a different compound, before the substance reaches the liquid phase generating area inside the rotary kiln.

In accordance with the cement clinker and the process for producing the same of the present invention, a sub stance serving as a nucleus of generation of alite is incorporated into at least one of cement raw material and a mixed raw material before a burning step, and as a result, the generation of alite can be accelerated from a temperature which is lower than before. Thereby, it is possible to bur a cement clinker having high quality by a small unit heat quantity for burning.

BEST MODE FOR CARRYING OUT THE INVENTION

Examples of the present invention will be specifically explained below.

Example 1

At first, materials to be used in test examples and comparative examples, examination items, and test methods are shown below.

1. Materials used

1) Firebrick; spinel brick

2) Cement mixed raw materials; limestone, clay, silica rock, iron raw material (by weight ratio of 78:15.5:2)

3) Fine powder of ordinary and high-early-strength Portland cement clinker, produced by MITSUBISHI MATERIALS CORPORATION Ltd.

4) Ordinary and high-early-strength Portland cement, produced by MITSUBISHI MATERIALS CORPORATION Ltd.

2. Examination Item and Test Method (1) Free Lime

In accordance with Standard test method of the Cement Association of Japan: "Method for quantitatively analyzing isolation calcium". That is, a test sample is boiled with a mixed solvent of glycerin and alcohol to elute calcium, and titration is performed using an alcohol solution of ammonium acetate.

(2) Unit Heat Quantity for Burning a Clinker

This is the value obtained by dividing the calorific value (unit: kcal/h) per hour of fuel required for burning clinker with the amount of clinker produced per hour (unit: t/h). The calorific value of uel is obtained by multiplying the fuel consumed amount per hour by the low calorific value.

Test Example 1, Comparative Example 1

Fine powder of refractory bricks having a melting point of approximately 1800° C. (particle size of not more than 149 μm) in an amount of 0.2 parts by weight was incorporated into 100 parts by weight of mixed raw materials particle size of not more than 210 μm) of ordinary Portland cement, in a raw material step. The resultant mixture was charged into a rotary kiln and burned at approximately 1450° C. The maximum heating temperature during the burning was 1500° C. (the maximum heating temperature when adding no fine powder of refractory firebricks was 1500° C.). The refractory firebricks had a composition of $SiO_2$:0.3%, $Al_2O_3$:17.1%, $Fe_2O_3$:3.0%. CaO:0.5%, MgO:79.1% The mineral composition of cement clinker obtained is show in Table 1. In Table 1, a test sample into which the fine powder of refractory firebricks was incorporated is expressed as Test Example 1, and a test sample into which no fine powder was incorporated is expressed as Comparative Example 1.

TABLE1

| | Clinker Mineral composition (wt. %) | | | |
|---|---|---|---|---|
| | $C_3S$ | $C_2S$ | $C_3A$ | $C_4AF$ |
| Test Example 1 | 57.2 | 20.4 | 8.7 | 9.0 |
| Comparative Example 1 | 57.2 | 20.3 | 8.8 | 9.0 |
| Test Example 2 | 57.2 | 20.4 | 8.7 | 9.6 |
| Comparative Example 2 | 57.0 | 20.5 | 8.9 | 9.5 |
| Test Example 3 | 55.1 | 22.1 | 8.9 | 8.7 |
| Comparative Example 3 | 55.3 | 21.8 | 9.1 | 8.9 |
| Test Example 4 | 69.1 | 10.8 | 8.5 | 7.6 |
| Comparative Example 4 | 69.0 | 11.1 | 8.2 | 7.9 |
| Test Example 5 | 56.3 | 23.3 | 7.9 | 9.6 |
| Comparative Example 5 | 56.7 | 23.4 | 8.1 | 9.5 |
| Test Example 6 | 56.1 | 21.8 | 8.4 | 9.4 |
| Comparative Example 6 | 57.0 | 21.1 | 8.6 | 9.1 |
| Test Example 7 | 69.8 | 10.9 | 8.1 | 7.6 |
| Comparative Example 7 | 69.3 | 11.3 | 8.1 | 7.4 |

(Explanatory Notes)

Compositions of each clinker mineral are values obtained by the Bogue formula from the chemical composition of clinker.

The obtained ordinary Portland cement clinker has a main chemical composition which is approximately the same as in the case of adding no fine powder of refractory firebricks. However, the average content of the free lime contained in the ordinary Portland cement clinker when a rotary kiln was operated for one week decreased from 0.9% to 0.6%. In addition the unit heat quantity for burning a clinker decreased from 650 kcal/t in the case of charging no fine powder of refractory firebricks to 644 kcal/t i.e. by approximately 1%

Test Example 2, Comparative Example 2

Using an electrostatic dust collector of a cement clinker cooler, particles of ordinary Portland cement clinker (having a particle size of not more than 5 mm) were collected, and the resultant particles in an amount of 8 kg per ton of a cement clinker were charged into a rotary kiln from a kiln-head through a dedicated blowing equipment toward the direction of kiln axis. In the rotary kiln, ordinary Portland cement was burned at approximately 1450° C. The maximum heating temperature during burning was approximately 1500° C. (the maximum heating temperature during burning in the case of charging no particles of ordinary Portland cement clinker was approximately 1550° C.). The melting point of fine particles of ordinary Portland cement was approximately 1700° C. The mineral composition of the cement clinker obtained is shown in Table 1 in the same way. In Table 1, a test sample into which particles of an ordinary Portland cement clinker were incorporated is expressed as Test Example 2, and a test sample into which no particles were incorporated is expressed as Comparative Example 2.

As a result, the ordinary Portland cement clinker had approximately the same main mineral composition as the case of charging no particles of the cement clinker thereinto. However the average content of free lime contained in the Portland cement clinker derived from the operation of the rotary kiln for one week was 0.4%, which was approximately the same as or slightly decreased to the case in which particles of ordinary Portland cement were not charged. In addition, the unit heat quantity for burning a cement clinker was lowered from 652 kcal/t of the case of charging no ordinary Portland cement clinker to 640 kcal/t, i.e. by approximately 2%.

Into a rotary kiln, fine powder of high early Portland cement (Brain surface area of 3500 $cm^2/g$) in an amount of 10 kg per ton of cement clinker was charged from a kiln-tail using a dedicated burner toward the direction of the kiln axis. In the rotary kiln, ordinary Portland cement was burned at approximately 1450° C. The melting point of fine particles of high-early-strength Portland cement was approximately 1700° C. The maximum heating temperature during burning was approximately 1500° C. (the maximum heating temperature during burning in the case of charging no particles of high-early-strength Portland cement clinker was approximately 1550° C.). The mineral composition of the cement clinker obtained is shown in Table 1 in the same way. In Table 1, a test sample into which fine powder of high-early-strength Portland cement clinker was incorporated is expressed as Test Example 3, and a test sample into which no fine powder was incorporated is expressed as Comparative Example 3.

As a result, the ordinary Portland cement clinker had approximately the same main mineral composition as the case of charging no particles of the cement clinker thereinto. However, the average content of free lime contained in the Portland cement clinker derived from the operation of the rotary kiln for one week was 0.4%, which was decreased by 0.2% compared to the case in which particles of ordinary Portland cement were not charged. In addition, the unit heat quantity for burning a cement clinker was lowered from 658 kcal/t in the case of charging no high-early-strength Portland cement clinker to 641 kcal/t, i.e. by approximately 3%.

Test Example 4, Comparative Example 4

Into a rotary kiln, fine powder of high early Portland cement (Brain surface area of 4300 $cm^2/g$) in an amount of 20 kg per ton of a cement clinker was mixed with fine powdery coal and charged from a kiln-head, using a fine powdery coal burner toward the direction of the kiln axis. In the rotary kiln, high-early-strength Portland cement was burned at approximately 1500° C. The melting point of fine particles of high-early-strength Portland cement was approximately 1700° C. The maximum heating temperature during burning was approximately 1550° C. (the maximum heating temperature during burning in the case of charging no particles of high-early-strength Portland cement clinker was approximately 1600° C.). The mineral composition of the cement clinker obtained is shown in Table 1 in the same way. In Table 1, a test sample into which fine powder of high-early-strength Portland cement clinker was incorporated is expressed as Test Example 4 and a test sample into which no fine powder was incorporated is expressed as Comparative Example 4.

As a result, the high-early-strength Portland cement clinker had approximately the same main mineral composition as the case of charging no particles of the high-early-strength Portland cement clinker thereinto. However, the average content of free lime contained in the Portland cement clinker derived from the operation of the rotary kiln for one week was 0.5%, which was hardly changed or slightly decreased. In addition, the unit heat quantity for burning a cement clinker was lowered from 655 kcal/t in the case of charging no high-early-strength Portland cement clinker to 631 kcal/t, i.e. by approximately 4%.

Test Example 5, Comparative Example 5

Using a blowing pipe, fine powder (Brain surface area 4,100 $cm^2/g$) of high-early-strength Portland cement clinker having a melting point of approximately 1700° C. in an amount of 5 kg per ton of cement clinker was charged into a burning furnace of a rotary kiln upon burning. The maximum heating temperature at the time of burning was approximately 1500° C. (the maxi mum heating temperature during burning in the case of charging no particles of high-early-strength Portland cement clinker was approximately 1550° C.) Mineral composition of the cement clinker obtained is shown in Table 1 in the same way. In Table 1, a test sample into which fine powder of high-early-strength Portland cement clinker was incorporated is expressed as Test Example 5, and a test sample into which no fine powder was incorporated is expressed as Comparative Example 5.

As a result, ordinary Portland cement clinker had approximately the same main mineral composition as the case of charging no fine powder of this clinker thereinto However, the average content of free lime contained in the ordinary Portland cement clinker derived from the operation of the rotary kiln for one week was 0.5%, which was decreased by 0.2%. In addition, the unit heat quantity for burning cement clinker was lowered from 647 kcal/t in the case of charging no high-early-strength Portland cement clinker to 634 kcal/t, i.e. by approximately 2%.

Test Example 6, Comparative Example 6

Into a rotary kiln, fine powder of limestone (Brain surface area of 6100 $cm^2/g$) in an amount of 10 kg per ton of cement clinker was mixed with fine powdery coal and charged from a kiln-head using a fine powdery coal burner toward the direction of the kiln axis. At this time, in the rotary kiln, ordinary Portland cement was burned at approximately 1450° C. The maximum heating temperature during burning was approximately 1500° C. (the maximum heating temperature during burning in the case of charging no fine powder of limestone was approximately 1550° C.). The mineral composition of the cement clinker obtained is shown in Table 1 in the same way. In Table 1, a test sample into which fine powder of limestone was incorporated is expressed as Test Example 6, and a test sample into which no fine powder was incorporated is expressed as Comparative Example 6.

As a result, as for the main mineral composition of the ordinary Portland cement clinker obtained the $C_3S$ content had slightly increased, compared to the case of charging no fine powder of limestone thereinto, but the other mineral contents were approximately the same. However, the average content of free lime contained in the ordinary Portland cement clinker derived from the operation of the rotary kiln for one week was 0.6%, which was decreased by 0%. In addition, the unit heat quantity for burning cement clinker was lowered from 658 kcal/t in the case of charging no fine powder of limestone to 648 kcal/t, i.e. by approximately 2%. It should be noted that the fine powder of quicklime is considered to have become the generation nucleus of a part of alite in the cement clinker, because the fine powder of limestone which was charged will decarboxylate at a high temperature and change into fine powder of quicklime, when the charged limestone comes into contact with the cement raw material or a cement clinker in the rotary kiln.

Test Example 7, Comparative Example 7

Fine powder of limestone (Brain surface area 4,500 $cm^2/g$) was mixed into in combustible material (a mixture of vinyl, plastic, small pieces of resins) and shaped with heating and pressing into a sphere having a diameter of approximately 20 cm, and high-early-strength Portland cement clinker was charged into a rotary kiln upon burning from a conduit (a housing) at the bottom of the preheater. The charged amount of fine powder of limestone was 15 kg per ton of a cement clinker. The maximum heating temperature during burning of the cement clinker was approximately 1600° C. Mineral composition of the cement clinker obtained is shown in Table 1 in the same way. In Table 1, a sample into which fine powder of limestone was incorporated is expressed as Test Example 7, an a sample into which no fine powder was incorporated is expressed as Comparative Example 7.

As a result, as for the main mineral composition of the high-early-strength Portland cement clinker obtained, the $C_3S$ content in the fine powder of limestone had slightly increased, compared to the case of charging no fine powder of limestone thereinto, but the other mineral contents were approximately the same. However, the average content of free lime contained in the high-early-strength Portland cement clinker derived from the operation of the rotary kiln for one week was 0.7%, which was decreased by 0.1%. In addition, the unit heat quantity for burning cement clinker was lowered from 659 kcal/t in the case of charging no fine powder of limestone to 647 kcal/t, i.e. by approximately 2%. It should be noted that the fine powder of quicklime was considered to have become the generation nucleus of a part of alite in the cement clinker, because the fine powder of limestone which was charged will decarboxylate at a high temperature and cha ge into fine powder of quicklime, when the charged limestone comes into contact with the cement raw material or a cement clinker in the rotary kiln.

INDUSTRIAL APPLICABILITY

The present invention is applicable to a cement clinker and a process for producing a cement clinker which can reduce the heat quantity in a burning process without changing the main chemical composition and mineral composition of cement.

The invention claimed is:

1. A process for producing a cement clinker which contains alite, comprising burning a mixed raw material which is mixed at a raw material step, at a burning step, wherein cement clinker, cement, refractory brick or a combination thereof serving as a nucleus of generation of alite having a melting point higher than the temperature of a liquid phase of said cement clinker is incorporated into at least one of said cement raw material and said mixed raw material before said burning step.

2. The process for producing a cement clinker as set forth in claim 1, wherein said cement clinker, cement, refractory brick or a combination thereof has a particle size of not more than 5 mm.

3. The process for producing a cement clinker as set forth in claim 1, wherein said burning is performed by clinker burning equipment having a preheater, a burning furnace and a rotary kiln, and said cement clinker, cement, refractory brick or a combination thereof is charged into at least one of said preheater, said burning furnace, in a kiln-head or a kiln-tail of said rotary kiln in said clinker burning equipment.

4. The process for producing cement clinker as set forth in claim 1, wherein said cement clinker, cement, refractory brick or a combination thereof has a particle size of not more than 0.01 mm.

5. The process for producing cement clinker as set forth in claim 1, wherein the cement clinker, cement, refractory brick or a combination thereof is charged into a kiln-head of a rotary kiln so as to be landed at an area between where a liquid phase of a cement clinker in a burning step begins to generate and where alite begins to generate, thereby reducing a quantity of heat required for burning cement clinker, compared to before charging.

6. The process for producing cement clinker as set forth in claim 4, wherein the cement clinker, cement, refractory brick or a combination thereof is charged into a kiln-head of a rotary kiln so as to be landed at an area between where a liquid phase of a cement clinker in a burning step begins to generate and where alite begins to generate, thereby reducing a quantity of heat required for burning cement clinker, compared to before charging.

7. A process for producing cement clinker which contains alite, the process comprising charging a nucleus of generation of alite into a Portland cement raw material mixture, wherein said nucleus of generation of alite comprises cement clinker, cement, refractory brick, or a combination thereof, and subsequently burning the resultant mixture of the nucleus of generation of alite and the Portland cement raw material mixture to produce cement clinker.

8. The process for producing a cement clinker as set forth in claim 7, wherein said cement clinker, cement, refractory brick or a combination thereof has a particle size of not more than 5 mm.

9. The process for producing a cement clinker as set forth in claim 7, wherein said burning is performed by clinker burning equipment having a preheater, a burning furnace and a rotary kiln, and said cement clinker, cement, refractory brick or a combination thereof is charged into at least one of said preheater, said burning furnace, in a kiln-head or a kiln-tail of said rotary kiln in said clinker burning equipment.

10. The process for producing cement clinker as set forth in claim 7, wherein said cement clinker, cement, refractory brick or a combination thereof has a particle size of not more than 0.01 mm.

11. The process for producing cement clinker as set forth in claim 7, wherein the cement clinker, cement, refractory brick or a combination thereof is charged into a kiln-head of a rotary kiln at a time between where a liquid phase of a cement clinker during said burning begins to form and where alite begins to form.

12. The process for producing cement clinker as set forth in claim 4, wherein the cement clinker, cement, refractory brick or a combination thereof is charged into a kiln-head of a rotary kiln so as to be landed at an area between where a liquid phase of a cement clinker in a burning step begins to generate and where alite begins to generate, thereby reducing a quantity of heat required for burning cement clinker, compared to before charging.

* * * * *